Patented Aug. 9, 1932

1,870,498

UNITED STATES PATENT OFFICE

HANS ELLNER, OF STUTTGART, GERMANY, ASSIGNOR TO GENERAL ANILINE WORKS, INC., OF NEW YORK, N. Y., A CORPORATION OF DELAWARE

CONCENTRATED SOLUTIONS FOR DYEING PURPOSES

No Drawing. Application filed August 12, 1929, Serial No. 385,470, and in Germany August 13, 1928.

The present invention relates to the manufacture of concentrated solutions of coupling components, the latter containing at least one hydroxy group and being free from a sulfonic or carboxylic acid group, and to new compositions of matter obtainable thereby.

The coupling components containing at least one hydroxy group and being free from a sulfonic acid or carboxylic acid groups, such as naphthols, and especially the 2.3-hydroxynaphthoic acid arylides, which have become of great importance for the production of ice colors on textile fibers, require for the production of their aqueous solutions necessary for the dyeing process, according to their solubility, a multiple of the theoretical quantity of caustic alkali and a long duration of boiling until solution has been achieved. A process is, therefore desirable, which permits the manufacture of such solutions in a simpler manner, particularly for the production of the concentrated stock solutions.

In accordance with the present invention solution of the 2.3-hydroxynaphthoic acid arylides can extraordinarily quickly be achieved when but the theoretical amount of a dilute caustic alkali solution is used; also completely clear solutions of very high concentration can be obtained even at room temperature.

The process is in accordance with the present invention carried out by intimately mixing one part by weight of a coupling component as above identified with about the theoretical quantity of caustic alkali in form of an aqueous solution of about 34° Bé., 1 to 1.5 parts by volume of a water-miscible mono hydric alcohol, especially methylalcohol, and ethylalcohol, and 1 to 2 parts by volume of water. My new compositions can be prepared in various ways; thus for example, a mixture of the necessary quantities of diluted caustic alkali, water and alcohol can be thoroughly stirred with the coupling component, until the latter substance has been dissolved, or otherwise the coupling component is made into a paste with the necessary quantity of the alcohol and then the calculated amount of the caustic alkali and the required quantity of water are added.

Furthermore it is of advantage to add to my composition a quantity of formaldehyde which quickly combines with the coupling component, whereby a hydrolytic dissociation of the naphtholate formed in the composition is prevented; generally I add about 0.5 to 1 part by volume of formaldehyde of 33% strength.

As already stated, the quantity of the alcohol miscible with water is kept low with the result that its presence in the slop padding bath does not influence adversely the affinity of the 2.3-hydroxynaphthoic acid arylide for the fiber. The 2.3-hydroxynaphthoic acid arylides in the form of their alkali metal salts are, as is known, dissolved in water in the form of colloids and their degree of dispersion varies according to the temperature of the solution. The degree of dispersion influences the substantivity of the 2.3-hydroxynaphthoic acid arylides (compare Melliands Textilberichte 1923, page 378) The use in the preparation of the 2.3-hydroxynaphthoic acid arylide solutions of unnecessarily large quantities of an organic solvent may increase the degree of dispersion of the arylides to such an extent that their affinity for the fiber suffers thereby; (compare the above cited publication).

According to my invention it is possible to prepare concentrated solutions of the coupling components above identified containing in a liter about 300 to 500 grams of said components. In preparing diluted solutions necessary for the drying process from my concentrated stock solutions, the latter are brought into the necessary quantity of water to which a protective colloid, for example, Turkey red oil, and caustic alkali, previously have been added. The caustic alkali serves for preventing the hydrolytic dissociation of the group OMe (Me=an alkali metal) present in the coupling component.

The invention is illustrated by the following examples, without being limited thereto:

*Example 1.*—10 parts by weight of 2.3-hydroxynaphthoic acid arylide are covered with 20 parts by volume of acetone and 4.2 parts by volume of caustic soda lye of 34° Bé., are added. Into this solution, which becomes clear immediately, 3.5 parts by volume of aqueous formaldehyde of 33% strength are poured and the solution is introduced with stirring into water, to which caustic soda solution and a protective colloid have been added.

*Example 2.*—A mixture of solvents is prepared containing: 500 parts by volume of methanol, 300 parts by volume of water and 150 parts by volume of caustic soda lye of 34° Bé. The dissolving is then carried out as follows: 10 parts by weight of 2.3-hydroxy-naphthoyl-5-chloro-ortho-toluidine are covered with 30 parts by volume of the above mentioned solution, whereupon the naphthol dissolves to a clear solution. To this are added 5 parts by volume of formaldehyde and the solution is poured into 1000 parts of water.

*Example 3.*—A mixture of solvents is prepared from: 380 parts by volume of denatured alcohol, 200 parts by volume of water, 110 parts by volume of caustic soda lye of 34° Bé. and 110 parts by volume of aqueous formaldehyde of 33% strength. The dissolving is then carried out as follows: 10 parts by weight of 2.3-hydroxynaphthoic acid-$\beta$-naphthalide are covered with 50 parts by volume of the above solution and introduced with stirring into water to which caustic alkali has been added.

In the specification and the claims "part by volume" is understood to be liter and "part by weight" kilogram. The expressions "theoretical quantity of a caustic alkali" in the specification and "theoretical quantity of a caustic alkali solution of 34° Bé." in the claims designate the amount of caustic alkali which is necessary in applicant's process to achieve solution of the coupling components, that is one molecule of a caustic alkali for each hydroxy group of said components.

I claim:

1. The process which comprises mixing one part by weight of a coupling component containing at least one hydroxy group and being free from sulfonic and carboxylic acid groups, with 1 to 1.5 parts by volume of a water miscible monohydric alcohol, and adding thereto the about theoretical quantity of a caustic alkali solution of 34° Bé. and 1 to 2 parts by volume of water.

2. The process which comprises mixing one part by weight of a coupling component containing at least one hydroxy group and being free from sulfonic and carboxylic acid groups, with 1 to 1.5 parts by volume of a water miscible monohydric alcohol, and adding thereto the about theoretical quantity of a caustic alkali solution of 34° Bé., 1 to 2 parts by volume of water, and 0.5 to 1 part by volume of aqueous formaldehyde of 33% strength.

3. The process which comprises mixing one part by weight of a coupling component containing at least one hydroxy group and being free from sulfonic and carboxylic acid groups, with 1 to 1.5 parts by volume of a solvent of the group consisting of ethylalcohol and methylalcohol, and adding thereto the about theoretical quantity of a caustic alkali solution of 34° Bé. and 1 to 2 parts by volume of water.

4. The process which comprises mixing one part by weight of a coupling component containing at least one hydroxy group and being free from sulfonic and carboxylic acid groups, with 1 to 1.5 parts by volume of a solvent of the group consisting of ethylalcohol and methylalcohol, and adding thereto the about theoretical quantity of a caustic alkali solution of 34° Bé., 1 to 2 parts by volume of water, and 0.5 to 1 part by volume of aqueous formaldehyde of 33% strength.

5. The process which comprises mixing one part by weight of a 2.3-hydroxynapthoic acid arylide with 1 to 1.5 parts by volume of ethylalcohol, adding thereto the about theoretical quantity of caustic soda lye of 34° Bé. and 1 to 2 parts by volume of water.

6. The process which comprises mixing one part by weight of a 2.3-hydroxynaphthoic acid arylide with 1 to 1.5 parts by volume of ethylalcohol, adding thereto the about theoretical quantity of caustic soda lye of 34° Bé., 1 to 2 parts by volume of water and 0.5 to 1 part by volume of aqueous formaldehyde of 33% strength.

7. As a new composition of matter a mixture comprising one part by weight of a coupling component containing at least one hydroxy group and being free from sulfonic and carboxylic acid groups, the about theoretical quantity of a caustic alkali solution of about 34° Bé., 1 to 1.5 parts by volume of a water-miscible monohydric alcohol and of 1 to 2 parts by volume of water, being a clear solution valuable in dyeing processes.

8. As a new composition of matter a mixture comprising one part by weight of a coupling component containing at least one hydroxy group and being free from sulfonic and carboxylic acid groups, the about theoretical quantity of a caustic alkali solution of about 34° Bé., 1 to 1.5 parts by volume of a water-miscible monohydric alcohol, 1 to 2 parts by volume of water and 0.5 to 1 part by volume of aqueous formaldehyde of 33% strength, being a clear solution valuable in dyeing processes.

9. As a new composition of matter a mixture comprising one part by weight of a coupling component containing at least one hydroxy group and being free from sulfonic and carboxylic acid groups, the about theoretical quantity of a caustic alkali solution of about 34° Bé., 1 to 1.5 parts by volume of a solvent of the group consisting of ethylalcohol and methylalcohol and 1 to 2 parts by volume of water, being a clear solution valuable in dyeing processes.

10. As a new composition of matter a mixture comprising one part by weight of a coupling component containing at least one hydroxy group and being free from sulfonic and carboxylic acid groups, the about theoretical quantity of a caustic alkali solution of about 34° Bé., about 1 to 1.5 parts by volume of a solvent of the group consisting of ethylalcohol and methylalcohol, 1 to 2 parts by volume of water and 0.5 to 1 part by volume of aqueous formaldehyde of 33% strength being a clear solution valuable in dyeing processes.

11. As a new composition of matter a mixture comprising one part by weight of a 2.3-hydroxynaphthoic acid arylide, the about theoretical quantity of caustic soda solution of 34° Bé., 1 to 1.5 parts by volume of ethylalcohol and about 1 to 2 parts by volume of water, being a clear solution valuable in dyeing processes.

12. As a new composition of matter a mixture comprising one part by weight of a 2.3-hydroxynaphthoic acid arylide, the about theoretical quantity of caustic soda solution of 34° Bé., 1 to 1.5 parts by volume of ethylalcohol, about 1 to 2 parts by volume of water, and 0.5 to 1 part by volume of aqueous formaldehyde of 33% strength, being a clear solution valuable in dyeing processes.

In testimony whereof I have hereunto set my hand.

HANS ELLNER. [L. S.]